(12) United States Patent
Rezvani et al.

(10) Patent No.: US 12,169,414 B2
(45) Date of Patent: Dec. 17, 2024

(54) DRONE NAVIGATION AND LANDING

(71) Applicant: Alarm.com Incorporated, Tysons, VA (US)

(72) Inventors: Babak Rezvani, Tysons, VA (US); Donald Gerard Madden, Columbia, MD (US); Glenn Tournier, Tysons, VA (US); Ahmad Seyfi, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 495 days.

(21) Appl. No.: 17/080,172

(22) Filed: Oct. 26, 2020

(65) Prior Publication Data

US 2021/0122467 A1   Apr. 29, 2021

Related U.S. Application Data (60) Provisional application No. 62/925,494, filed on Oct. 24, 2019.

(51) Int. Cl.
| | |
|---|---|
| *G05D 1/00* | (2024.01) |
| *B64U 10/14* | (2023.01) |
| *B64U 50/31* | (2023.01) |
| *B64U 70/90* | (2023.01) |
| *B64U 80/25* | (2023.01) |
| *B64U 101/30* | (2023.01) |

(Continued)

(52) U.S. Cl.
CPC ............ *G05D 1/106* (2019.05); *B64U 10/14* (2023.01); *B64U 50/31* (2023.01); *B64U 70/90* (2023.01); *B64U 80/25* (2023.01); *G06F 18/24* (2023.01); *G06V 20/10* (2022.01); *G06V 20/17* (2022.01); *G06V 20/176* (2022.01); *G08G 5/0069* (2013.01); *G08G 5/02* (2013.01); *G08G 5/045* (2013.01); *B64U 2101/30* (2023.01); *B64U 2201/10* (2023.01)

(58) Field of Classification Search
CPC ...... G05D 1/106; G06V 20/17; G06V 20/176; G06V 20/10; G08G 5/0069
See application file for complete search history.

(56) References Cited

U.S. PATENT DOCUMENTS 10,137,984 B1 * 11/2018 Flick ................. B64C 39/024
11,434,005 B1    9/2022 Matheson et al.
(Continued)

FOREIGN PATENT DOCUMENTS

| DE | 102015115184 A1 * | 3/2017 | ........... B64C 39/024 |
|---|---|---|---|
| FR | 3046284 A1 * | 6/2017 | |
| WO | WO-2019152312 A1 * | 8/2019 | ............. B64C 23/00 |

OTHER PUBLICATIONS

Translation of DE-102015115184-A11.*
Translation of DE-102015115184-A1.*
Translation of FR-3046284-A1.*

*Primary Examiner* — James M McPherson
*Assistant Examiner* — Kyle J Kingsland
(74) *Attorney, Agent, or Firm* — Fish & Richardson P.C.

(57) ABSTRACT

Methods, systems, and apparatus for drone navigation within a property. A method includes detecting an obstacle in a navigation path of a drone, determining a classification of the obstacle, determining whether to temporarily land based on the classification of the obstacle, and temporarily landing the drone until the obstacle clears the navigation path of the drone.

18 Claims, 4 Drawing Sheets

(51) Int. Cl.
  *G06F 18/24*    (2023.01)
  *G06V 20/10*    (2022.01)
  *G06V 20/17*    (2022.01)
  *G08G 5/00*     (2006.01)
  *G08G 5/02*     (2006.01)
  *G08G 5/04*     (2006.01)

(56) References Cited

U.S. PATENT DOCUMENTS

| | | |
|---|---|---|
| 11,745,870 B1 | 9/2023 | Nevdahs et al. |
| 2016/0107749 A1 | 4/2016 | Mucci |
| 2016/0300496 A1 | 10/2016 | Cheatham, III et al. |
| 2016/0371984 A1* | 12/2016 | Macfarlane .......... G06V 20/176 |
| 2017/0019644 A1 | 1/2017 | K V et al. |
| 2017/0076616 A1* | 3/2017 | Kanade .................. G06V 10/56 |
| 2017/0227965 A1 | 8/2017 | Decenzo et al. |
| 2017/0365150 A1* | 12/2017 | Bennett ................ G05D 1/0088 |
| 2018/0096541 A1* | 4/2018 | O'Brien ................ G06Q 50/28 |
| 2019/0204076 A1* | 7/2019 | Nishi .................. H04L 67/5651 |
| 2019/0279151 A1 | 9/2019 | Felice et al. |
| 2020/0310467 A1* | 10/2020 | Birkedahl .............. G01S 13/86 |
| 2021/0110723 A1* | 4/2021 | Tazume ................ G08G 5/045 |

\* cited by examiner

DRONE NAVIGATION AND LANDING

CROSS-REFERENCE TO RELATED APPLICATION

This application claims the benefit of U.S. Application Ser. No. 62/925,494 filed on Oct. 24, 2019, which is incorporated herein by reference in its entirety.

TECHNICAL FIELD

This disclosure application relates generally to monitoring systems.

BACKGROUND

Many properties are equipped with property monitoring systems that include sensors and connected system components. Property monitoring systems can receive and analyze data from sensors that are internal and external to the property. Sensors can be fixed or can be mobile. Mobile sensors can be mounted on robotic devices such as drones.

SUMMARY

Techniques are described for detecting obstacles and planning path in view of obstacles. For instance, the drone recons obstacles to determine depth and possible paths to best navigate the obstacles. The drone also uses techniques to determine whether obstacles being detected are real or noise. The drone also identifies doors and determines whether to wait for the door to open or return to the dock. In some instances, the drone may be able to open doors connected to motors. The drone further uses techniques for safe landing by identifying the best places to land in terms of ability to be discovered and safety from being inadvertently damaged. During landing, the drone performs a non-vertical landing approach.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
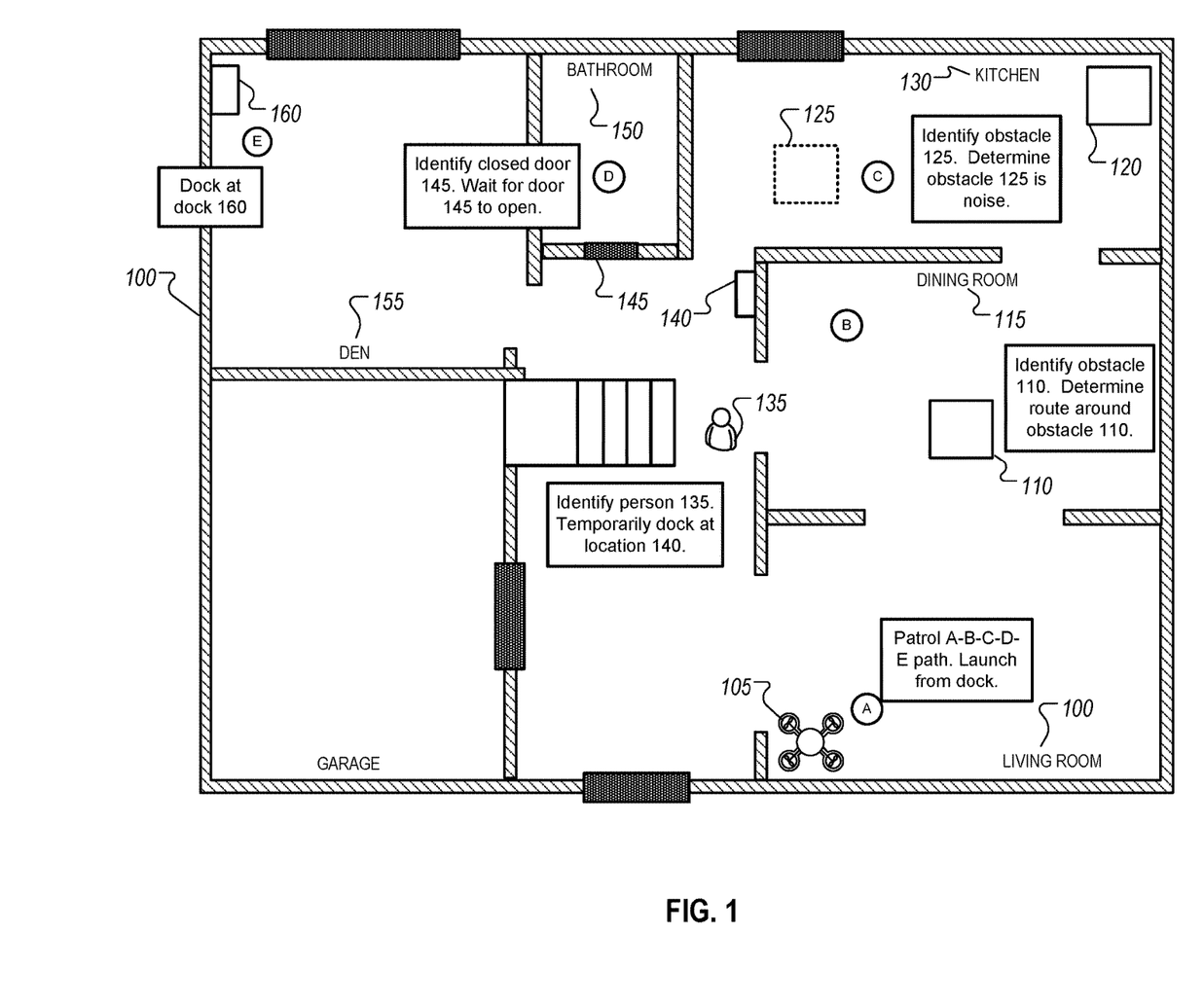
FIG. 1 illustrates an example drone navigating a property and landing.

FIG. 1 illustrates an example drone 105 navigating a property 100 and landing at dock 140. Briefly, and as described in more detail below, the drone 105 is navigating the property 100. While navigating the property 100, the drone 105 may identify and avoid obstacles, temporarily dock to avoid moving objects, and wait for doors to open. The drone 105 may use a combination of data collected from onboard sensors and data received from a monitoring system of the property to determine a path to navigate the property 100.

The drone 105 initiates a navigation sequence of the property 100. The navigation sequence includes instructions to navigation to locations B, C, D, and E. The drone 105 is initially located at location A in the living room 100. Location A may include a dock that charges the drone 105 while the drone 105 is located on the dock. The drone 105 launches from the dock and determine a path to location B.

The drone identifies an obstacle 110 between the drone 105 and location B. The obstacle 110 may be located in the dining room 115. The obstacle 110 may be any type of object that may impede the movement of the drone 105. For example, the obstacle 110 may be a table, chair, light fixture, couch, or any other similar object. The drone 105 may use on board sensors to collect sensor data. The drone 105 may analyze the sensor data to determine that there is an obstacle 110 in the dining room 115. The drone 105 may also receive sensor data from the monitoring system of the property 100. The monitoring system may include sensors at various locations around the property 100.

With the drone 105 at location B, the drone 105 determines how to navigate to location C in the kitchen 130. Based on analyzing the sensor data, the drone 105 determines that there is an opening between the dining room 115 and the kitchen 130. The drone 105 also identifies an opening between the dining room 115 and the hallway, but a person 135 is standing in that opening. Because the person is standing in the opening, the drone 105 determines to navigate to location C through the opening between the dining room 115 and the kitchen 130.

While determining the navigation path from location B to location C or while in the process of navigation from location B to location C, the drone 105 identifies obstacles 120 and obstacles 125. The drone 105 may determine an obstacle confidence score that reflects a likelihood that an identified obstacle is physical obstacle as opposed to noise. The drone 105 may determine the obstacle confidence score by analyzing sensor data from the onboard sensors and/or analyzing sensor data from the monitoring system. If the obstacle confidence score satisfies a threshold, then the drone 105 determines that the obstacle is likely a physical obstacle and plans a navigation path around the obstacle. If the obstacle confidence score does not satisfy the threshold, then the drone 105 determines that the obstacle is likely noise and plans a navigation path as if the obstacle was not there The drone 105 determines an obstacle confidence score for obstacle 125 and obstacle 120. Based on the obstacle confidence scores, the drone 105 determines that obstacle 125 is noise and the obstacle 120 is a physical obstacle. Accordingly, the drone 105 determines a navigation path assuming that obstacle 125 does not exist. In some instances, the drone 105 determines an obstacle confidence score for obstacles that are only in the determined navigation path. The drone 105 may not determine an obstacle confidence score for obstacle 120 because the obstacle 120 is not obstructing the path from location B to location C.

At location C, the drone 105 determines a navigation path to location D. Location D is in the bathroom 150 and the door 145 is closed. Also, person 135 is in the hallway and could impede the movement of the drone 105 while in the hallway. In this case, the drone 105 may determine to wait in the hallway at dock 140. The drone 105 may determine to wait at dock 140 to allow the person 135 to move out of the hallway to allow for easier navigation from location C to location D. In some instances, there may not be a dock for the drone 105 to wait for the person 135 to move out of the hallway. In this case, the drone 105 may be configured to move to a corner of the room and wait for the person 135 to move out of the hallway. In some instances, the drone 105 may be configured to dock on a wall that does not include a dedicated drone dock by attaching to the wall using suction cups or other ways to attach to the wall. In some instances, the drone 105 may be configured to dock to the wall by plugging into an outlet. This may allow the drone 105 to charge while waiting.

Once the person 135 has moved out of the hallway and has been perceived to have moved, the drone continues to location D. The drone 105 determines that the door 145 that leads to location D is closed. The drone 105 may determine whether to wait for the door to open or temporarily return to dock 140 to wait for the door to open. The drone 105 may consider the battery power remaining, any collected or received sensor data, the location of the dock 140, what the door leads to, and the remaining navigation path to determine whether to wait at the door 145 or return to the dock 140 and wait. In some instances, the drone may transmit a command to the monitoring system to open the door 145 if the door 145 includes a motor that allows for automatically opening the door 145.

Once the door 145 opens, the drone 105 navigates to location D and plans a route to location E in the den 155. The drone 105 determines a path through the door 145 to the dock 160 at location D. In this case, the drone 105 does not identify any obstacles between location D and location E other than walls. The drone 105 determines a path that allows for smooth navigation to limit jerking, which can deplete the battery faster than smooth navigation. The drone 105 reaches location E and docks at dock 160.

Drone 105 can perform safe operations in the presence of people and property, specifically landing. For example, if the drone 105 is unable to determine a proper trajectory to exit the bathroom 150, the drone 105 will search for a suitable landing position to continue avoid obstacles. Once an unobstructed path to the floor has been detected by onboard sensors, it will perform a landing and shutoff motors. In most situations where the drone 105 is unable to determine a trajectory to meet a final objective, the drone 105 will initiate a safe landing operation.

In a residential setting and to create an unobtrusive product, a landing station for a drone is typically places against walls, on a counter, or adjacent to objects, which can cause landing and launching difficulties for the most propulsion mechanism for drones.

Figure 2:
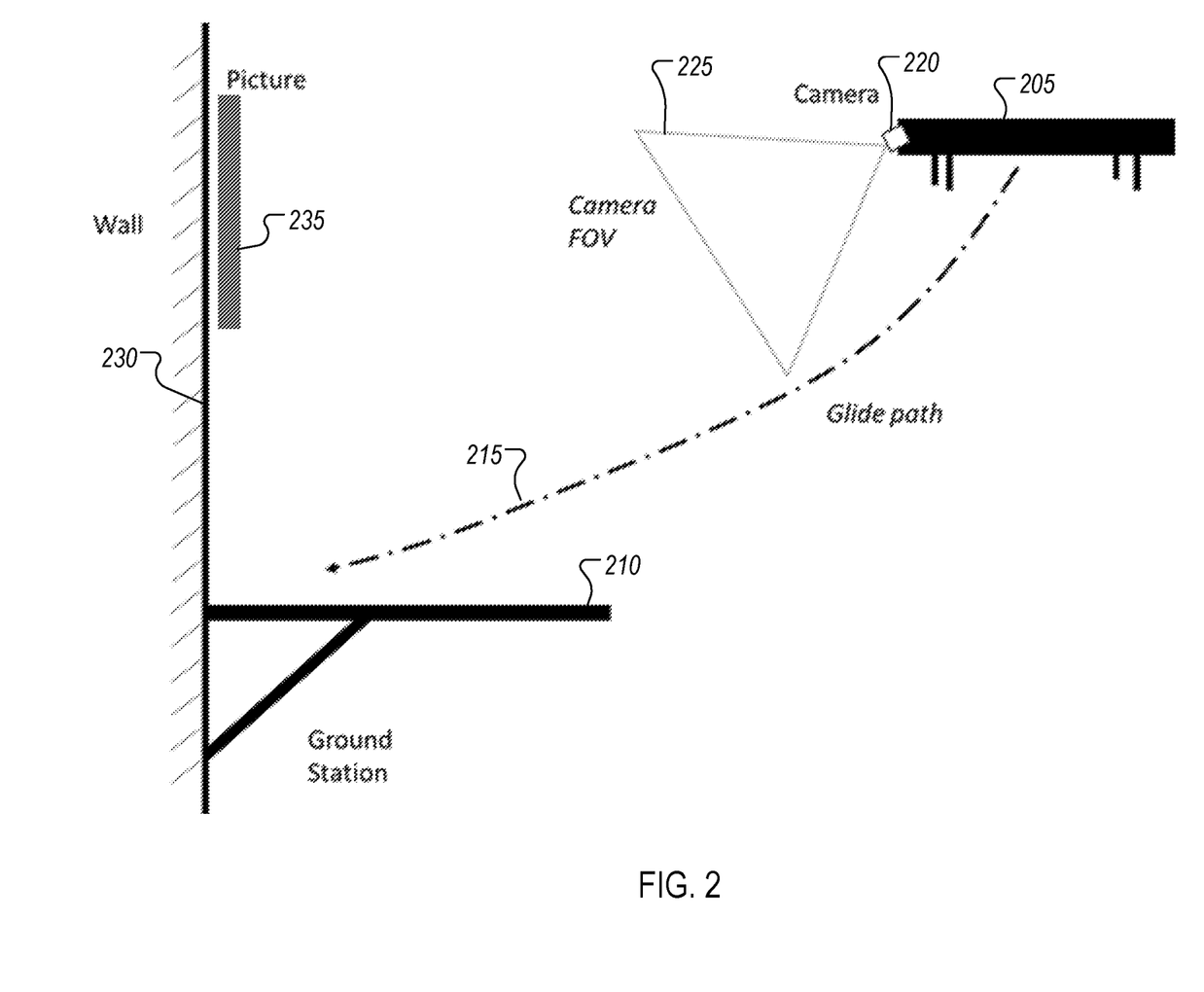
FIG. 2 illustrates an example drone approaching a landing station at an angle.

Traditional landing approaches for quadcopter-type designs is to approach the landing station vertically to simplify the approach and minimize the amount of action required to counter ground effect and maintain trajectory. FIG. 2 illustrates an example drone 205 approaching a ground station 210 at an angle or curved trajectory. The landing approach path 215 is at a glide angle to maintain the landing station 210 in the field of view 225 of front mounted cameras 220. This approach has several advantages.

First, this approach negates the need for the drone 205 to include a downward facing camera for visual tracking in a vertical approach. Second, this approach reduces the wall effect if the ground station 210 is placed against a wall 230. The wall effect is induced with the turbulent air from the propulsion system of the drone 205 interfaces with the physical wall 230, which generates pressure differentials around the drone 205 and thus, generating disturbance forces. By approaching at an angle, this effect is reduced. Some pressure differentials may exist at the end of the trajectory when the drone 205 is near the landing station 210 and the wall 230.

Third, this approach virtually eliminates the need to modify or remove wall furnishings 235, e.g., paintings, pictures, mirror, in the landing space. Removal would be required to prevent interference with flight operations by reducing the generation of turbulent forces when the drone 205 is near the wall furnishing 235. If the drone 205 were to approach the landing station 210 from above, then the proximity between the drone 205 and the wall furnishing 235 would increase turbulence which would increase the change of the drone 205 causing damage to the wall furnishing 235. A non-vertical flight trajectory approach, e.g., path 215, is not affected by furnishing and expands the number of available installation locations.

Figure 3:
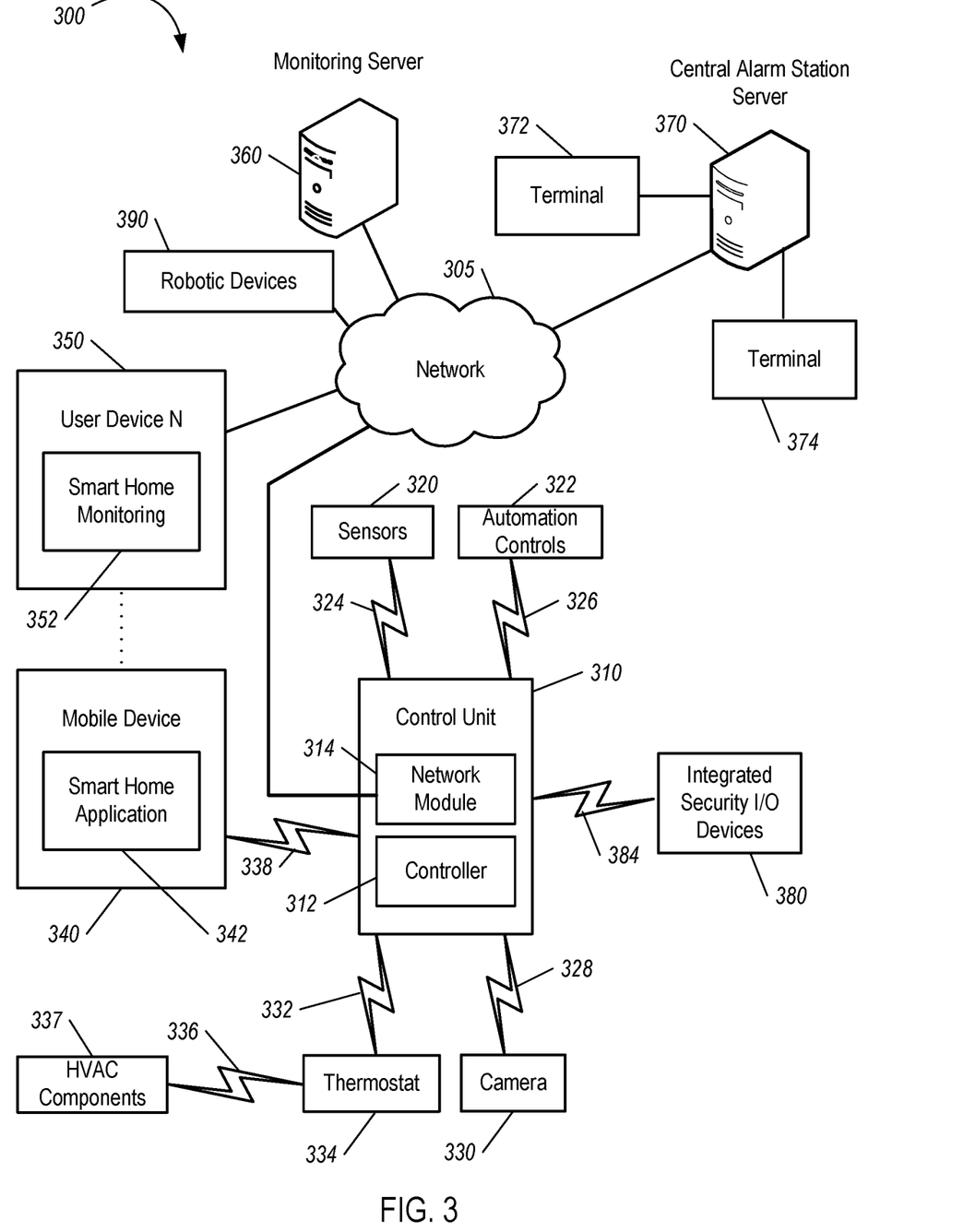
FIG. 3 is a diagram illustrating an example of a property monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 108). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In some examples, the drone 105 can leverage external sensors and visual markings to localize within the space. This localization enables movement throughout the mapped space. Theses external sensors can require either on target to the drone or off-target positioning systems such as motion capture, etc.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

Figure 4:
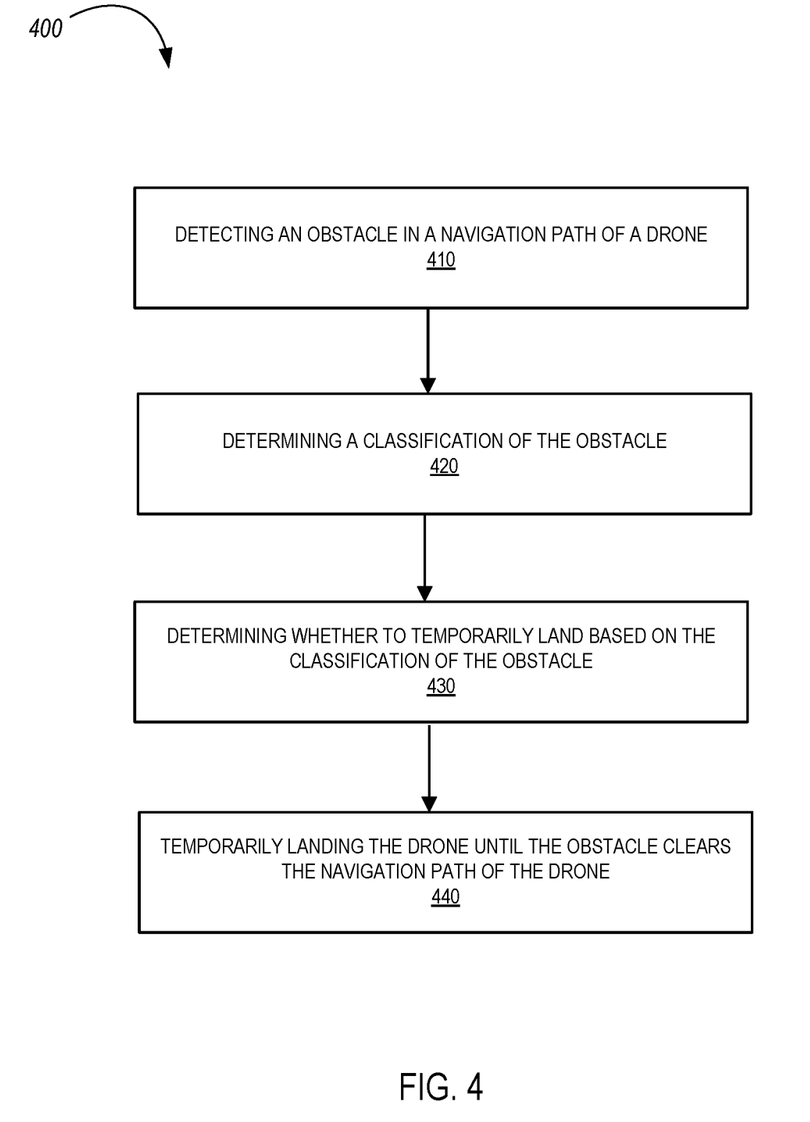
FIG. 4 is a flowchart of an example process for drone navigation within a property.

FIG. 4 is a flowchart of an example process 400 for drone navigation within a property. For example, the process 400 may be performed by the drone 105 or the control unit 310. Briefly, and as will be described in more detail below, the process 400 includes detecting an obstacle in a navigation path of a drone (410), determining a classification of the obstacle (420), determining whether to temporarily land based on the classification of the obstacle (430), and temporarily landing the drone until the obstacle clears the navigation path of the drone (440).

The process 400 includes detecting an obstacle in a navigation path of a drone (410). For example, the drone 105 may be flying to the bathroom 150 and determine from video captured by drone 105 that a closed door, human, or some other obstacle is in the doorway to the bathroom 150.

The process 400 includes determining a classification of the obstacle (420). For example, the drone 105 may determine from video captured by the drone 105 that the obstacle in the doorway to the bathroom is a stationary human. In another example, the drone 105 may determine from video captured by the drone 105 that the obstacle in the doorway to the bathroom is a closed door.

In some implementations, determining a classification of the obstacle includes determining that the drone is localized correctly and that obstacle is likely a physical obstacle and not likely noise. For example, the drone 105 may determine an obstacle confidence score that indicates a 95% confidence that the obstacle is a physical obstacle as opposed to noise, determine that the score satisfies a threshold of 80%, and, in response, determine that the obstacle is likely a physical obstacle. In another example, the drone 105 may detect the obstacle in the doorway and, in response, analyze video captured by the drone 105 to verify that the drone 105 is actually located where the drone 105 thinks it is and is not instead at another location.

In some implementations, determining a classification of the obstacle includes determining that the obstacle is not moving. For example, the drone 105 may determine from multiple frames that there is no motion detected in video captured by the drone 105. In another example, the drone 105 may determine from multiple frames that there is motion in a background but the obstacle in the doorway is not moving.

In some implementations, determining a classification of the obstacle includes determining that the obstacle is a human or a door. For example, the drone 105 may determine that visual features captured of the obstacle match visual features expected of a human. In another example, the drone 105 may provide the video to a human detector that is trained to detect humans and receive an output that indicates that a human is detected within a bounding box in the video. In yet another example, the drone 105 may determine that visual features captured of the obstacle match visual features expected of a door.

In some implementations, determining that the obstacle is a door includes determining that the door that cannot be opened by a monitoring system. For example, the drone 105 may determine that the door matches a door that is not motorized to automatically open in response to instructions from a monitoring system.

The process 400 includes determining whether to temporarily land based on the classification of the obstacle (430). For example, the drone 105 may determine to temporarily land on the ground in a corner next to the doorway to the bathroom 150 based on the classification of the obstacle. In another example, the drone 105 may determine to return to the dock 140 and wait for the obstacle to clear the navigation path based on the classification of the obstacle. In yet another example, the drone 105 may determine to hover in place instead of temporarily landing based on the classification of the obstacle.

In some implementations, determining whether to temporarily land based on the classification of the obstacle includes determining that the classification of the obstacle indicates that the obstacle is not moving and based on determining that the classification of the obstacle indicates that the obstacle is not moving, determining to temporarily land. For example, the drone 105 may determine that the obstacle is a stationary human and, in response, determine to temporarily land. In another example, the drone 105 may determine that the obstacle is a closed door and, in response, determine to temporarily land. In yet another example, were the drone 105 to determine the obstacle is a moving human, the drone 105 may hover in place and wait for the human to clear the doorway and then proceed along the navigation path through the doorway.

In some implementations, determining whether to temporarily land based on the classification of the obstacle includes determining that the classification of the obstacle indicates that the obstacle is not a human and based on determining that the classification of the obstacle indicates that the obstacle is not a human, determining to temporarily land. For example, the drone 105 may determine that the obstacle is a door and, in response, determine to temporarily land. In another example, were the drone 105 to determine that the obstacle is a human, the drone 105 may determine to hover in place whether or not the human is moving as the human may be likely to move soon.

In some implementations, determining whether to temporarily land based on the classification of the obstacle includes determining that the classification of the obstacle indicates that the obstacle is a door that cannot be opened by a monitoring system and based on determining that the classification of the obstacle indicates that the obstacle is a door that cannot be opened by the monitoring system, determining to temporarily land. For example, the drone 105 may determine that the obstacle is a particular closed door, determine that the closed door cannot be opened by the monitoring system and, in response, temporarily land. In yet another example, were the drone 105 to determine that the obstacle is a door that can be opened by a monitoring system, the drone 105 may instruct the monitoring system to open the door, hover in place until the door is fully open, then pass through the doorway, and then instruct the monitoring system to close the door again.

In some implementations, determining whether to temporarily land based on the classification of the obstacle includes determining that the drone is not on a time sensitive task and determining to temporarily land based on determining that the drone is not on a time sensitive task and the classification of the obstacle. For example, the drone 105 may determine that the drone is returning to the dock which is not time sensitive and, based on that determination, temporarily land. In another example, the drone 105 may determine that the drone is flying to check out an alarm event which is time sensitive and, based on that determination, hover in place so it can continue along the navigation as quickly as possible once the obstacle clears the navigation path.

In some implementations, determining whether to temporarily land based on the classification of the obstacle includes determining a battery power remaining satisfies a low power threshold and determining to temporarily land based on the battery power remaining satisfying the low power threshold and the classification of the obstacle. For example, the drone 105 may determine that it is at 10% battery power, which satisfies a low power threshold of below 20%, and determine to temporarily land until the obstacle clears. In another example, the drone 105 may determine that it is at 30% battery power, which does not satisfy a low power threshold of below 20%, and determine to hover in place land until the obstacle clears or the battery power goes below 20%.

In some implementations, determining whether to temporarily land based on the classification of the obstacle includes determining that clearance of the obstacle is not detectable while the drone is at a dock and, based on determining that clearance of the obstacle is not detectable while the drone is at a dock, determining to land the drone at a location where clearance of the obstacle is detectable by the drone. For example, the drone 105 may determine that the doorway is not visible from the dock 140 and, in response, determine to temporarily in a closest corner of a room with its camera facing the doorway. In another example, the drone 105 may determine that the doorway is visible from the dock 140 and, in response, determine to temporarily land on the dock 140.

In some implementations, determining whether to temporarily land based on the classification of the obstacle includes determining that an alternate navigation path is not available. For example, the drone 105 may determine that there is no other path into the bathroom besides through the bathroom doorway and, in response, determine to temporarily land and wait instead of taking some alternate path into the bathroom.

In particular, in response to classifying an obstacle as one that is unlikely to clear a path in a few seconds, a drone or control unit may determine from a map whether there is one or more alternate routes, weigh the cost, e.g., distance and/or time, and risk of obstacles on the alternate route, e.g., based on geometry, past history, etc., against waiting, temporarily landing, or returning to base. For example, if there was another route that was longer but feasible given time/battery constraints on distance, the drone 105 might immediately chose it if it encountered a stationary obstacle on the primary route, but might chose to wait for a moving obstacle unless the alternate route was much closer in length than the primary.

The time the drone 105 might wait for an obstacle might be influenced by the cost of this secondary route, e.g., the drone might determine that it has eight minutes of battery left and it will take a total of six minutes to take the secondary route and then return to base and, in response, might only wait one minute on the primary route so that the secondary route is still an option and after that minute then take the secondary route. Additionally, the drone 105 might determine whether to temporarily land based on the waiting time until an alternate path is taken. For example, temporarily landing may reduce the amount of battery power used by the drone 105 as the drone 105 does not need use power to stay in the air. However, while temporarily waiting the drone 105 may still be using power to capture images and determine from the images whether the obstacle has cleared the path.

The process 400 includes temporarily landing the drone until the obstacle clears the navigation path of the drone (440). For example, the drone 105 may land in a corner, on the dock 140, or suction to wall and once the obstacle moves out of a doorway, take off and fly through the doorway.

In some implementations, temporarily landing the drone until the obstacle clears the navigation path of the drone includes determining a location to land the drone based on an expected path of the obstacle. For example, the drone 105 may determine that a door is expected to swing outwards into a corner of a room closest to the doorway and, in response, determine to land in another corner with its camera facing the door. In another example, the drone 105 may determine that a human is expected to walk through a door and take a right and, in response, determine to land on the other side of the door where the human is not expected to walk.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A computer-implemented method comprising:
detecting an obstacle in a navigation path of a drone;
for each of two or more obstacles, including the obstacle:
determining whether the respective obstacle is in the navigation path of the drone; and
in response to determining that the respective obstacle is in the navigation path, determining a classification of the respective obstacle that indicates whether the respective obstacle is moving;
determining that an alternate navigation path is not available; and
determining whether the classification of the obstacle indicates the obstacle is (a) moving or (b) not moving;
for at least a first obstacle of the two or more obstacles, in response to (i) determining that the classification of the respective obstacle indicates the respective obstacle is not moving and (ii) determining that an alternate navigation path is not available, landing the drone until the obstacle clears the navigation path of the drone; and
for at least a second obstacle of the two or more obstacles, in response to (i) determining that the classification of the respective obstacle indicates the respective obstacle is moving and (ii) determining that an alternate navigation path is not available, hovering the drone until the obstacle clears the navigation path of the drone.

2. The method of claim 1, comprising:
determining that the drone is not performing a task that satisfies a time sensitivity threshold; and
performing an action of landing in response to determining that the drone is not performing a task that satisfies the time sensitivity threshold and the classification of a third obstacle.

3. The method of claim 1, comprising:
determining that a battery power satisfies a low power threshold; and
performing an action of landing in response to (i) determining that the battery power satisfies the low power threshold and (ii) the classification of a third obstacle.

4. The method of claim 1, comprising:
determining that a third obstacle is not visible while the drone is at a dock; and
performing an action, in response to determining that the third obstacle is not visible while the drone is at a dock, of landing the drone at a location where the third obstacle is visible by the drone.

5. The method of claim 1, wherein determining the classification of the obstacle comprises:
determining an obstacle score for the obstacle that indicates a likelihood that the obstacle is a physical obstacle instead of noise;
determining that the obstacle score of the obstacle satisfies an obstacle threshold; and
in response to determining that the obstacle score of the obstacle satisfies the obstacle threshold, verifying whether a predicted location of the drone substantially matches an actual location of the drone.

6. The method of claim 1, wherein landing the drone comprises:
determining a location to land the drone based on an expected path of the obstacle, and
landing the drone at the location.

7. A non-transitory computer-readable medium storing software comprising instructions executable by one or more computers which, upon such execution, cause the one or more computers to perform operations comprising:
detecting an obstacle in a navigation path of a drone;
for each of two or more obstacles, including the obstacle:
determining whether the respective obstacle is in the navigation path of the drone; and
in response to determining that the respective obstacle is in the navigation path, determining a classification of the obstacle that indicates whether the obstacle is moving; and
determining that an alternate navigation path is not available;
for at least a first obstacle of the two or more obstacles, in response to (i) determining that the classification of the respective obstacle indicates the respective obstacle is not moving and (ii) determining that an alternate navigation path is not available, landing the drone until the obstacle clears the navigation path of the drone; and
for at least a second obstacle of the two or more obstacles, in response to (i) determining that the classification of the respective obstacle indicates the respective obstacle is moving and (ii) determining that an alternate navigation path is not available, hovering the drone until the obstacle clears the navigation path of the drone.

8. The medium of claim 7, wherein the operations comprise:
determining that the drone is not performing a task that satisfies a time sensitivity threshold; and
performing an action of landing in response to determining that the drone is not performing a task that satisfies the time sensitivity threshold and the classification of a third obstacle.

9. The medium of claim 7, wherein the operations comprise:
determining that a battery power satisfies a low power threshold; and
performing an action of landing in response to (i) determining that the battery power satisfies the low power threshold and (ii) the classification of a third obstacle.

10. The medium of claim 7, wherein the operations comprise:
determining that a third obstacle is not visible while the drone is at a dock; and performing an action, in response to determining that the third obstacle is not visible while the drone is at a dock, of landing the drone at a location where the third obstacle is visible by the drone.

11. The medium of claim 7, wherein determining the classification of the obstacle comprises:
determining an obstacle score for the obstacle that indicates a likelihood that the obstacle is a physical obstacle instead of noise;
determining that the obstacle score of the obstacle satisfies an obstacle threshold; and
in response to determining that the obstacle score of the obstacle satisfies the obstacle threshold, verifying whether a predicted location of the drone substantially matches an actual location of the drone.

12. The medium of claim 7, wherein landing the drone comprises:
determining a location to land the drone based on an expected path of the obstacle, and
landing the drone at the location.

13. A system comprising:
one or more computers and one or more storage devices storing instructions that are operable, when executed by the one or more computers, to cause the one or more computers to perform operations comprising:
detecting an obstacle in a navigation path of a drone;
for each of two or more obstacles, including the obstacle:
determining whether the respective obstacle is in the navigation path of the drone; and
in response to determining that the respective obstacle is in the navigation path, determining a classification of the obstacle that indicates whether the obstacle is moving; and determining that an alternate navigation path is not available;

for at least a first obstacle of the two or more obstacles, in response to (i) determining that the classification of the respective obstacle indicates the respective obstacle is not moving and (ii) determining that an alternate navigation path is not available, landing the drone until the obstacle clears the navigation path of the drone; and for at least a second obstacle of the two or more obstacles, in response to (i) determining that the classification of the respective obstacle indicates the respective obstacle is moving and (ii) determining that an alternate navigation path is not available, hovering the drone until the obstacle clears the navigation path of the drone.

14. The system of claim 13, wherein the operations comprise:

determining that the drone is not performing a task that satisfies a time sensitivity threshold; and performing an action of landing in response to determining that the drone is not performing a task that satisfies the time sensitivity threshold and the classification of a third obstacle.

15. The system of claim 13, wherein the operations comprise:

determining that a battery power satisfies a low power threshold; and performing an action of landing in response to (i) determining that the battery power satisfies the low power threshold and (ii) the classification of a third obstacle.

16. The system of claim 13, wherein the operations comprise:

determining that a third obstacle is not visible while the drone is at a dock; and performing an action, in response to determining that the third obstacle is not visible while the drone is at a dock, of landing the drone at a location where the third obstacle is visible by the drone.

17. The system of claim 13, wherein determining the classification of the obstacle comprises:

determining an obstacle score for the obstacle that indicates a likelihood that the obstacle is a physical obstacle instead of noise;

determining that the obstacle score of the obstacle satisfies an obstacle threshold; and in response to determining that the obstacle score of the obstacle satisfies the obstacle threshold, verifying whether a predicted location of the drone substantially matches an actual location of the drone.

18. The system of claim 13, wherein landing the drone comprises:

determining a location to land the drone based on an expected path of the obstacle, and landing the drone at the location.

\* \* \* \* \*